United States Patent Office 3,245,460
Patented Apr. 12, 1966

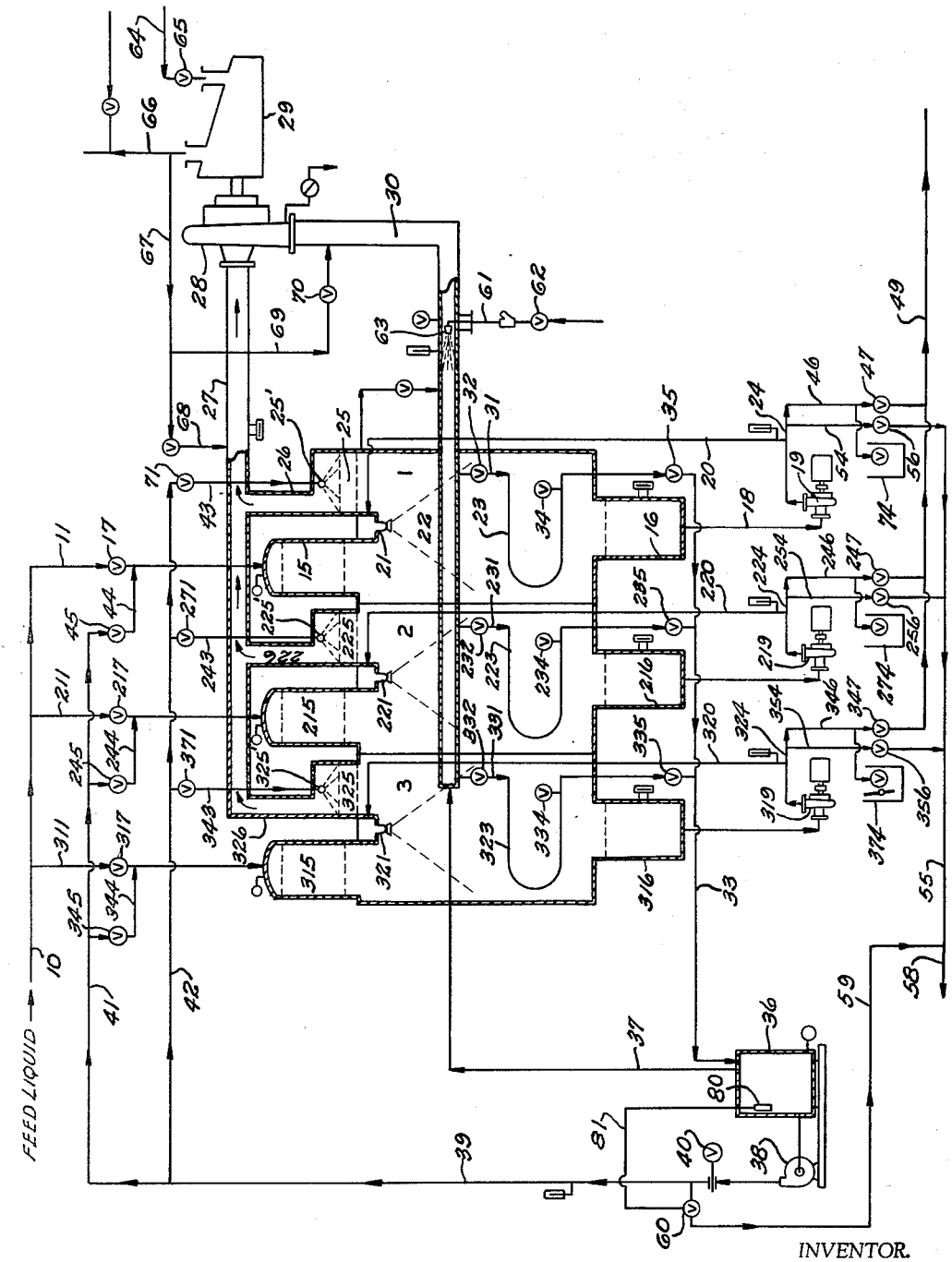

3,245,460
ART OF REMOVING SCALE IN MULTIPLE UNIT
EVAPORATOR SYSTEMS
Frederick A. Loebel, Milwaukee, Wis., assignor to
Aqua-Chem, Inc., Waukesha, Wis., a corporation of
Wisconsin
Filed May 2, 1962, Ser. No. 191,776
1 Claim. (Cl. 159—24)

This invention relates to improvements in the art of removing scale in multiple unit evaporator systems.

Evaporators have heretofore been used to remove water from a feed liquid in order to obtain a more concentrated product, and also have been used for the purpose of producing a potable or chemically pure water from saline or impure water. Evaporators of the type of which the present invention is concerned are particularly effective in conjunction with waste sulphite liquor to remove a substantial amount of the water content in the process of concentrating the solids.

In the use of such evaporators difficulties are commonly encountered because the calcium solids which are present in the feed liquid cause scaling on the heat exchange surfaces. Such scaling decreases the efficiency of the heat exchange process and makes removal at regular intervals necessary. Heretofore various methods have been attempted for reducing the amount of scale which is formed or for facilitating the removal thereof. None of these prior methods, however, have been entirely satisfactory.

It has heretofore been recognized that the condensate which is delivered from an evaporator of this type can be employed for scale removing purposes. Prior procedures, however, have involved an interchange of the paths of the fluids through the evaporating unit at periodic intervals so that the passage which conducted feed liquid during one period would conduct a heating medium during a following period, with the heating medium passage in turn conducting feed liquid. Apparatus for effecting such interchange of paths involves complicated valving arrangements and presents numerous problems.

It is a general object of the present invention to provide a multiple evaporator system comprising a plurality of like evaporator units, there being a simplified method of providing a scale removing rinse for one of the units by the use of condensate from all of the other units. With this arrangement, all of the units can be operated continuously in a normal manner except the one unit being rinsed, and there is no need for a periodic shutdown.

A further object of the invention is to provide a method as above described wherein a proper liquid balance in the several operating units is always maintained whereby the operation of the working units is in no way interfered with by the process of scale removal which is going on in the unit being rinsed, there being means to ensure that the proper amount of liquid at proper concentration is being sprayed over the heat exchange tubes in the working units to cover the tubes and get adequate evaporation, thereby preventing dry tubes as well as preventing too heavy a concentration on the tubes, which latter condition might overload the device and lower the efficiency of heat transfer.

With the above and other objects in view, the invention consists of the improvements in the art of removing scale in multiple unit evaporators, and all of its parts, combinations and steps as set forth in the claims and all equivalents thereof.

In the accompanying drawing, the figure schematically illustrates a preferred embodiment of apparatus for carrying out the invention. While vapor compression type evaporators are shown, it is to be understood that the present invention is suitable for use in connection with other arrangements such as the well-known multi-effect evaporation systems.

In the drawing three evaporator units have been illustrated, i.e. 1, 2 and 3, it being understood that the present invention may be used in conjunction with a system having two or more evaporator units preferably of the type shown and described in FIG. 2 of co-pending application of Frederick A. Loebel, Serial No. 169,480, filed January 29, 1962. Corresponding parts of evaporator unit 2 will be designated by the same reference numerals used in evaporator unit 1 except that they will be preceded by the digit 2. Likewise, in evaporator unit 3 the same numerals will be employed for corresponding parts preceded by the digit 3. Units 2 and 3 will not be individually described, as the description of unit 1 will suffice.

Referring more particularly to the drawing, the diluted feed liquid enters through a conduit 10 from any suitable source. This may be any feed liquid to be processed but the illustrated exemplification of the invention is particularly suited for evaporating sulphite liquor. Leading from the inlet conduit 10 are connecting conduits 11, 211 and 311.

Referring now to the connecting conduit 11, this leads to a deaerator 15 of evaporator unit 1. Deaerators are well-known and are essentially scrubbers of any conventional construction, the feed liquid being sprayed or otherwise introduced into the top and traveling down through the deaerator 15 by gravity counter-currently to scrubbing gases. The deaerated feed liquid eventually passes into the hotwell 16 at the bottom of the evaporator unit 1 where it mixes with unevaporated liquid concentrate in said hotwell. Suitable valve means 17 in the conduit 11 may admit a proper amount of feed liquid to maintain the proper mixture of feed liquid and concentrate in the hotwell 16. Mixture from the hotwell is constantly withdrawn through the line 18 by the pump 19. A majority of the feed mixture is delivered by the pump upwardly through line 20 into a spray head 21 from which it is sprayed into the vaporizing chamber 22 onto heat exchange tubes 23. Rinsing as described herein is particularly effective when used with horizontal heat exchange tubes as illustrated herein and also as illustrated and described in detail in co-pending application of Frederick A. Loebel, Serial No. 169,480, filed January 29, 1962. This delivery may be by means other than spraying. The amount of mixture which is delivered through the conduit 20 into the spray head constitutes a majority of the delivery from the hotwell 16 through the outlet pipe 18. For example, twelve parts of the mixture from 18 may be delivered up through the tube 20 to one part which is delivered into the line 24 for a purpose to be hereinafter described.

Due to the heat and pressure to which the feed liquid is subjected inside of the vaporizing chamber 22, a portion of the water contained therein vaporizes and passes through the demister 25 or entrainment separator. These vapors are constantly withdrawn through the demister into the vapor outlet conduit 26, the latter communicating with a header conduit 27 leading to a compressor 28. The latter may be driven by a turbine 29 and serves to compress the withdrawn vapor and dischareg it through a conduit 30 which is connected by branch conduit 31 controlled by a valve 32 with the heat exchange tubes. While passing through conduit 30 the vapor is desuperheated by a condensate spray at 63, to be hereinafter described in greater detail. In the course of its travel through the heat exchange tubes 23 the compressed vapor gives up its heat of compression and its latent heat, with the feed liquid being sprayed against the outer side of the heat exchange tubes 23. Thus the vapors discharged from the vapor compressor 28 are in indirect heat exchange relation to the sprayed feed liquid. The vapor in the tubes 23 begins to condense and the condensate is withdrawn through line 33, there being a vent control valve 34 at the outlet end of the heat exchange tubes 23 for purging of non-condensible gases, there being a valve 35 in the condensate discharge line.

The condensate from the line 33 is directed into a hotwell 36. An equalizing line 37 leads from the top of the hotwell to the header 30. The hotwell 36 is adapted to continuously receive condensate from two of the units for use in the unit which is to be rinsed for descaling.

The condensate in the hotwell 36 is withdrawn by a pump 38 and sent through a conduit 39 past a valve 40. The conduit 39 communicates with conduits 41 and 42. The conduit 42 communicates through valve-controlled connecting conduits 43, 243, and 343 with the washing sprays 25', 225', and 325' of the demisters 25, 225, and 325 of the several evaporator units so that a demister of the evaporator unit which is being rinsed may be rinsed at the same time as the tubes.

The condensate conduit 41 communicates through connecting conduits 44, 244 and 344, under control of valves 45, 245 and 345, with the feed liquid inlet conduits 11, 211, and 311 respectively, whereby rinsing condensate may be substituted for feed liquid in the inlet conduit of the evaporator unit which is to be rinsed.

The minor part of concentrate from the hotwell 16 which is not being directed to the spray head 21 is directed through a conduit 46, past valve 47, into a concentrate product conduit 49. In a sulphite liquor evaporator this may comprise liquor which is between approximately 14% and 40% solids.

Also leading from the conduit 24 is a conduit 54 which communicates with an outlet conduit 55. The latter is adapted to take off spent wash water from a unit which is being rinsed, the water passing into line 55 and then into discharge line 58 for suitable disposal. In view of the fact that the condensate which is being discharged from the other two units into the hotwell 36 may be in excess of the spent wash water being taken off at 55 from the unit being rinsed, provision is made for maintaining a proper balance between condensate used for rinsing and condensate produced by units evaporating feed liquid. This is accomplished through use of a valve 60, under control of a level-sensing device 80 connected through a sensing line 81 with the valve 60, whereby excess condensate from the line 39 is directed through line 59 to discharge, either by way of the line 58 as illustrated or to separate disposal.

As indicated at 61, desuperheating water from a suitable source, such as condensate from the line 39, under control of a valve 62, may be sprayed into the compressor discharge pipe 30, through spray 63, for the purpose of desuperheating the steam therein. The turbine 29 may be operated by high pressure steam admitted through conduit 64 past a valve 65, there being a steam exhaust 66 from the turbine. A conduit 67, connected with line 66, may communicate with conduit 68 which leads into the vapor line 27 to the compressor to superheat the vapor and to prevent the mixture from causing corrosion in the compressor. Additional exhaust steam may be directed through conduit 69, under control of a valve 70, into the compressor outlet 30 to furnish make-up steam.

The numeral 74 designates a density sampling tank which is for the purpose of sampling concentrate from the conduit 46.

*Operation*

In operation, assuming that evaporator unit No. 3 is the one being rinsed, when this occurs condensate from units Nos. 1 and 2 is being continuously withdrawn through condensate line 33, valves 35 and 235 being open, and valve 335 from the unit being rinsed being closed. In addition, valve 317 controlling the admission of feed liquid to evaporator unit 3 is closed to prevent such admission while valves 17 and 217, leading to evaporator units Nos. 1 and 2 respectively are open. The rinsing condensate being pumped through conduit 39 by the pump 38 is then delivered into the conduit 331 leading to unit 3, valve 345 being open while valves 45 and 245 leading to evaporator units 1 and 2 respectively are closed. In addition, rinsing condensate from conduit 42 is directed through conduit 343 into the demister 325 of unit No. 3 to wash the demister, valve 371 which controls the flow through conduit 343 being open, and valves 71 and 271 leading to evaporator units 1 and 2 respectively being closed.

The rinsing condensate from the lines 41 and 344 into the evaporator unit No. 3 finds its way into the hotwell 316 and is circulated by pump 319 up through the conduit 320 into the spray head 321 to spray the rinsing condensate over the evaporator tubes 323. During such procedure valve 347 below evaporator unit No. 3 is kept closed to prevent rinsing condensate from passing into the concentrate line 49. Valve 356 is open in line 354 to permit removal of a desired amount of spent wash water from unit No. 3 which is being rinsed, this amount plus the amount taken off at 59 being equal to the condensate production of units Nos. 1 and 2 combined. Referring to the corresponding valves on units Nos. 1 and 2 respectively, the valves 47 and 247 are open and the valves 56 and 256 are closed.

During rinsing of evaporator unit No. 3, valve 332 is closed to prevent delivery from the compressor to the interior of the heat exchange tubes in unit No. 3. Corresponding valves 32 and 232 of units Nos. 1 and 2 respectively are, of course, open while these units are operating.

It is apparent from the above that two of the units may be in continual operation while a third unit is being rinsed by condensate from the evaporation cycle of the two operating units, said condensate being sprayed over the heat exchange surfaces of the unit which is to be rinsed to effectively remove scale therefrom. After a unit such as unit No. 3 has been satisfactorily rinsed, then the valves are reversed to put it back in the operating cycle, and one of the other units, such as No. 1 or No. 2, is put on the rinse cycle by a suitable adjustment of the valves, as heretofore described in connection with evaporator unit No. 3. In this way a multiple unit evaporator may be kept in continuous operation, one of the units being subject to a rinsing operation as required.

It is also apparent that the system accomplishes balance by removal of spent wash water from the unit being rinsed and disposal of excess condensate from the operating units.

Various changes and modifications may be made without departing from the spirit of the invention, and all of such changes are contemplated as may come within the scope of the claim.

What I claim is:

A liquid evaporator system comprising a plurality of at least three evaporator units for concentrating a liquid feed by vaporization from the feed; each of said units having a heating surface, means for supplying heat to the heating surface, selectively operable means for delivering the feed liquid to be evaporated to said heating surface whereby scale is deposited on said heating surface, means for recovering product concentrate, and means for directing vapors formed from the liquid feed the evaporator unit; means for recovering and condensing vapors; selectively operable means for selecting one of said three evaporator units for cleaning of scale from the heating surface including means for stopping delivery of liquid feed to the selected evaporator; means for delivering condensed vapor to the liquid feed delivery means of the selected unit from the remaining of said units to wash the heating surface of the selected unit while the delivery of feed liquid to said selected unit is stopped and while the feed liquid delivering means for the other two units is operating; and selectively operable means for cutting off said heat supply means to the heating surface of the selected unit during cleaning.

References Cited by the Examiner
UNITED STATES PATENTS

| | | | |
|---|---|---|---|
| 936,760 | 10/1909 | Childs. | |
| 2,191,052 | 2/1940 | Velasco et al. | 159—31 |
| 2,326,099 | 8/1943 | Kokatnur et al. | 159—47 X |
| 2,734,565 | 2/1956 | Lockman | 159—20 |
| 2,746,536 | 5/1956 | Sumiya | 159—17 |
| 2,759,882 | 8/1956 | Worthen. | |
| 2,781,089 | 2/1957 | Mair et al. | 159—20 |
| 2,788,065 | 4/1957 | Lockman | 159—20 |
| 2,863,501 | 12/1958 | Farnsworth | 159—24 |
| 2,954,822 | 10/1960 | Keville | 159—31 X |
| 2,979,442 | 4/1961 | Badger | 159—47 |

FOREIGN PATENTS

| | | |
|---|---|---|
| 6,661 | 6/1904 | Denmark. |
| 562,352 | 11/1923 | France. |
| 646,894 | 11/1928 | France. |
| 358,872 | 9/1922 | Germany. |
| 1,091,532 | 10/1960 | Germany. |

NORMAN YUDKOFF, *Primary Examiner.*